United States Patent [19]

Pirl et al.

[11] Patent Number: 4,736,092
[45] Date of Patent: Apr. 5, 1988

[54] BRAZE HEATER ASSEMBLY AND METHOD

[75] Inventors: William E. Pirl, Penn Township, Allegheny County; John M. Driggers, Penn Hills; Donald R. Stoner, Murrysville Boro, all of Pa.

[73] Assignee: Westinghouse Electric Corp., Pittsburgh, Pa.

[21] Appl. No.: 720,107

[22] Filed: Apr. 4, 1985

[51] Int. Cl.$^4$ ............................................. H05B 3/06
[52] U.S. Cl. ................................... 219/523; 219/355; 219/546; 338/270; 338/302; 338/303; 338/305
[58] Field of Search ............... 219/523, 546, 541, 552, 219/553; 338/264, 260, 261, 267, 274

[56] References Cited

U.S. PATENT DOCUMENTS 4,523,177 6/1985 Driggers .............................. 338/303
4,572,938 4/1986 Driggers et al. .............. 219/85 BM Primary Examiner—C. L. Albritton

[57] ABSTRACT

An improved heater assembly and method for applying a brazing heat across a selected longitudinal section of a tube is disclosed herein. The heater assembly generally comprises a heater mandrel having an electrical resistance heating element coiled thereabout, and a support mandrel for supporting and centering this heating element. The heater mandrel further includes a means for directing a flow of inert gas in the space between the coiled heating element and the inner walls of the tube being brazed in order to purge this space of ambient atmospheric oxygen and prevent the heater mandrel from oxidizing. The support mandrel includes a centering means in the form of two roller assemblies, each of which has three spring-loaded rollers equidistantly spaced 120° around its diameter. In the method of the invention, the heater mandrel is inserted into the tube and slid across the longitudinal section to be brazed. The heater then applies a brazing heat while a purging flow of inert gas is directed in the annular space between the coiled heating element and the inner walls of the tube. After the brazing operation has been completed, the flow of purge gas may be increased to cool down the heater assembly. The heater assembly is particularly useful for brazing reinforcing sleeves across sections of corrosion-damaged heat exchange tubes in nuclear steam generators.

33 Claims, 5 Drawing Sheets

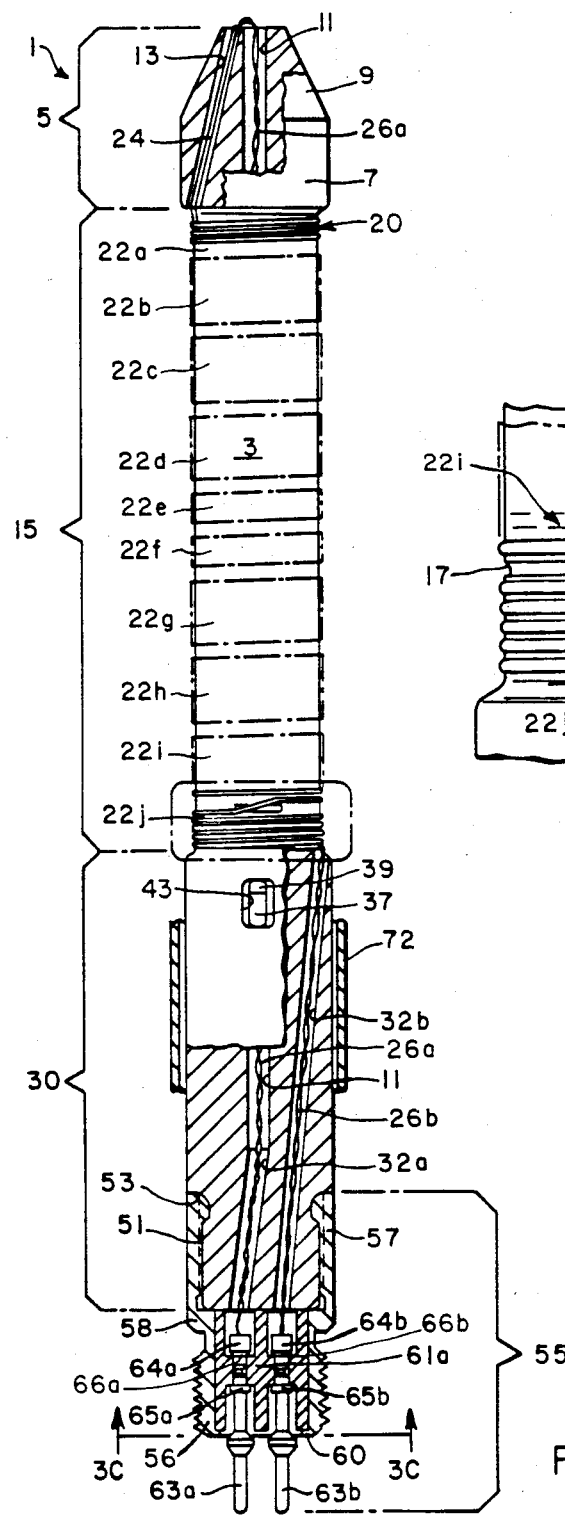
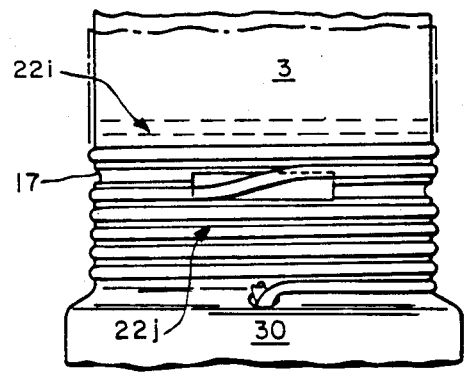
FIG. 1B
FIG. 1A

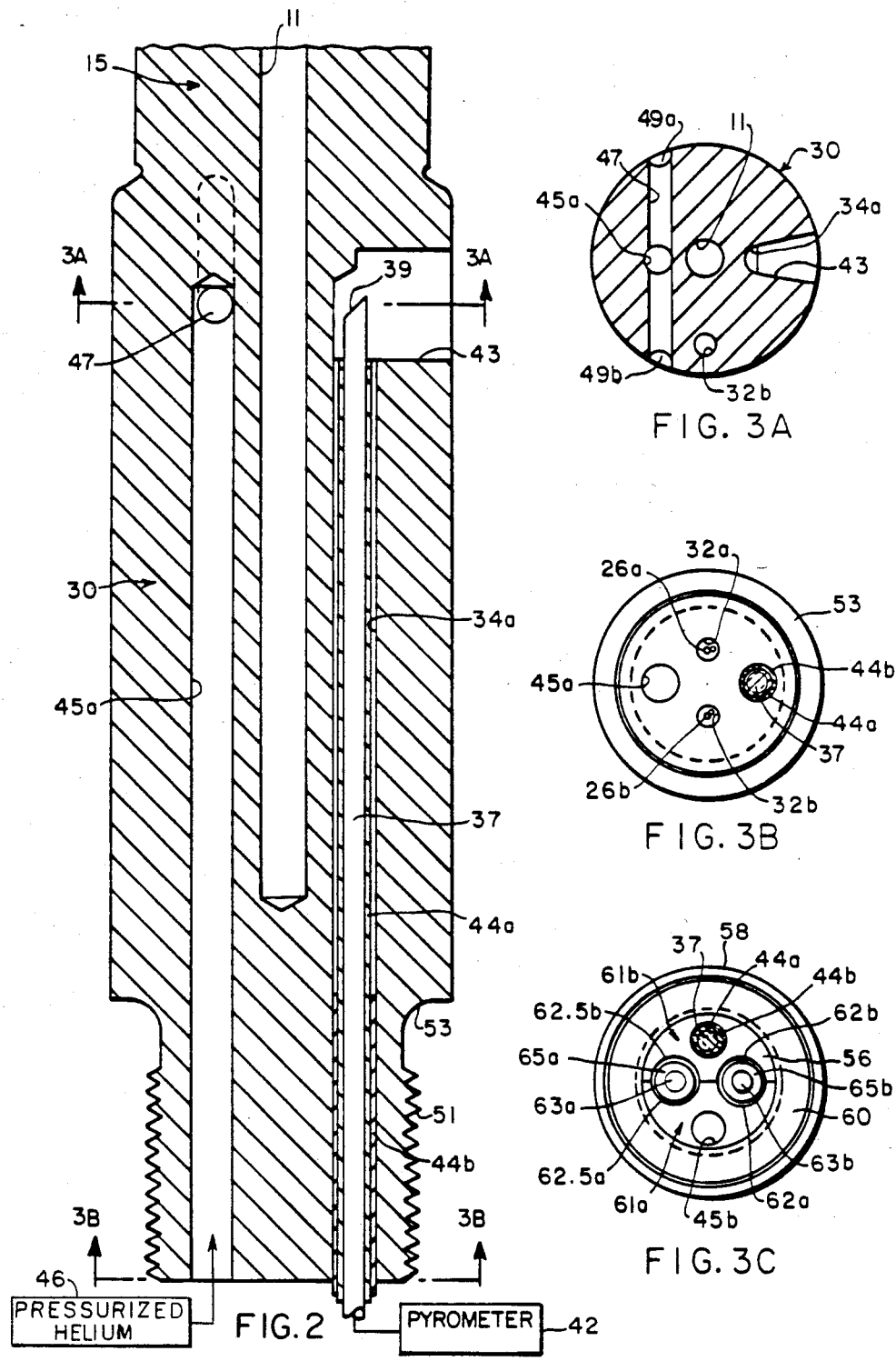

BRAZE HEATER ASSEMBLY AND METHOD

BACKGROUND OF THE INVENTION

1. Field of the Invention

This invention generally relates to an improved heater assembly and method for applying a brazing heat across a selected longitudinal section of a tube. The invention is particularly useful in brazing reinforcing sleeves within the heat exchange tubes of nuclear steam generators.

2. Description of the Prior Art

Heater assemblies for applying a brazing heat to the inside surfaces of conduits are known in the prior art. Such heaters are used to braze reinforcing sleeves within the heat exchange tubes of nuclear steam generators damaged by corrosion. In such prior art processes, a tubular sleeve which is circumscribed at each end by a ring of brazing alloy is inserted into a tube in need of repair and slidably positioned across the section of the tube where the walls are in a damaged condition due to corrosion or denting. The ends of the tube surrounded by the rings of brazing alloy are then usually hydraulically expanded so that they snugly engage the inner walls of the tube. To complete the joint, a brazing heater assembly having an electrical resistance wire coiled therearound is slid up the sleeve and actuated so that the heat generated by the wire melts the rings of brazing alloy disposed between the outer wall of the sleeve and the inner wall of the tube, thereby forming a pair of watertight braze joints between the ends of the sleeve and the tube. Such prior art sleeving operations are frequently performed in the longitudinal sections of the heat exchange tubes which extend through the tubesheet of the nuclear steam generator due to the tendency of the walls in these tubes to corrode and dent in the region. Specific examples of such heater assemblies are set forth in U.S. patent application Ser. Nos. 571,214 and 571,215, filed on Jan. 16, 1984 by John M. Driggers and John M. Driggers et al, respectively, and assigned to Westinghouse Electric Corporation. While such heater assemblies are capable of producing high-quality braze joints between corrosion-damaged heat exchange tubes and the ends of the reinforcing sleeves used to repair these tubes, such heaters are not entirely without shortcomings. For example, the useful service life of the heater mandrel is often unsatisfactorily short due to the tendency of the mandrel material (preferably boron nitride) to oxidize and "burn out" in response to the heat generated by the electrical heating element coiled therearound. Additionally, since the various components forming such heater assemblies are permanently attached to one another, the burning out of the heater mandrel usually necessitates the disposal of the entire heater assembly. Finally, such heater assemblies occasionally transfer heat to the inside walls of the tube through a non-uniform heat flux due to the lack of any positive centering force on the heater mandrel. This deficiency can have at least two serious consequences. First, such non-uniformities in the heat flux might leave a portion of the ring of brazing alloy incompletely fuxed, thereby resulting in a poor-quality braze joint. Second, if the operator of the heater assembly is attempting to utilize a temperature sensor in conjunction with the heater assembly to confirm whether a proper amount of brazing heat has been applied to the inside surface of the reinforcing sleeve, such non-uniformities can lead to inaccurate temperature readings. Such a combination heater assembly and temperature sensor is described and claimed in U.S. patent application Ser. No. 720,105, filed Apr. 4, 1985 entitled "Radiant Brazing Temperature Sensing Apparatus and Process", by John M. Driggers and assigned to Westinghouse Electric Corporation, the entire specification of which is expressly incorporated herein by reference.

Clearly, there is a need for a heater assembly having a means for eliminating (or at least reducing) the oxidation of the heater mandrel caused by its contact with the electrical resistance heating element. Ideally, such a heater assembly should also have some sort of means for positively centering the heater mandrel so that heat is transferred in a uniform pattern from the coil of electrical resistance wire to the inner walls of the sleeve. Such a positive centering force would have the additional beneficial effect of preventing the coil windings from scraping against the inner surface of the sleeve, which in turn preserves the coil from damage. Finally, it would be desirable if the various major components of the heater assembly were detachable, so that major components which wear out may be conveniently replaced.

SUMMARY OF THE INVENTION

In its broadest sense, the invention is an improved braze heater assembly and method for applying a brazing heat to the inside of a conduit.

The improved braze heater assembly includes a heater mandrel having a means for directing a flow of inert gas in the inside of the conduit being heated in order to purge this space of ambient atmospheric oxygen and to thereby prevent the heater mandrel from oxidizing. This significantly improves the useful lifespan of the heater assembly. In the preferred embodiment, the heater mandrel is formed from a generally cylindrical central portion flanked on either side by a leading and a trailing shoulder, respectively. The means for directing the flow of inert gas may include a bore in the interior of the trailing shoulder of the heater mandrel which is connected to a source of pressurized, inert gas at one end, and which terminates in a gas-directing flute located in the side of the trailing shoulder of the heater mandrel. The heater mandrel may also have an electrical resistance element wound around its central portion in a plurality of spaced-apart coil sections for generating a uniform pattern of heat flux along the longitudinal axis of the central portion. In such a configuration, the leading and trailing shoulders may be enlarged in order to prevent the coil sections from coming into contact with the inside surface of the conduit being heated. Additionally, the annular space between the inner edges of the leading and trailing shoulders and the outer surface of the cylindrical central portion of the heater mandrel may define a partially enclosed space which is easily purged by the stream of inert gas flowing out of the fluted end of the gas bore in the trailing shoulder.

The heater mandrel may also include a support mandrel having a centering means for centering the heater mandrel within the conduit. In the preferred embodiment, the centering means includes a distal and a proximal roller assembly, each of which has three spring-loaded rollers uniformly spaced 120° apart around the diameter of the support mandrel. When the heater assembly is slidably inserted into a conduit, the proximal roller assemblies apply a positive centering force to the heater mandrel, so that the electrical resistance element coiled around the central portion of the heater mandrel will uniformly apply radiant heat around the interior walls of the tube.

Finally, the heater mandrel may have a connector assembly having at least one terminal pin, and the support mandrel may include an electrical receptacle for detachably engaging this pin. Finally, the heater assembly may include a clamping means for detachably securing the proximal end of the heater mandrel with the distal end of the support mandrel. The provision of such a connector assembly and clamping means allows the heater mandrel to be quickly and conveniently replaced in the event of a mandrel burn-out.

The method of the invention generally includes the steps of sliding the heater assembly across the longitudinal section of the conduit to be brazed, and then applying a brazing heat to this section while directing a stream of inert purging gas around the heater mandrel to prevent it from oxidizing. When the inert gas used is helium, the purging flow may enhance the heat transfer between the heater assembly and the conduit. The method may further include the step of increasing the purging flow of gas after the brazing operation is completed in order to cool down the heater assembly.

BRIEF DESCRIPTION OF THE SEVERAL FIGURES

FIG. 1A is a partial cross-sectional side view of the heater mandrel of the heater assembly of the invention;

FIG. 1B is an enlarged view of the dotted section of FIG. 1A;

FIG. 2 is a cross-sectional side view of the trailing shoulder of the heater mandrel;

FIG. 3A is a cross-sectional view of the trailing shoulder of the heater mandrel taken along line A—A in FIG. 2;

FIG. 3B is a cross-sectional view of this trailing shoulder taken along line B—B in FIG. 2;

FIG. 3C is a cross-sectional view of this trailing shoulder taken along line C—C in FIG. 1A;

DETAILED DESCRIPTION OF THE PREFERRED EMBODIMENT

Figure 4:
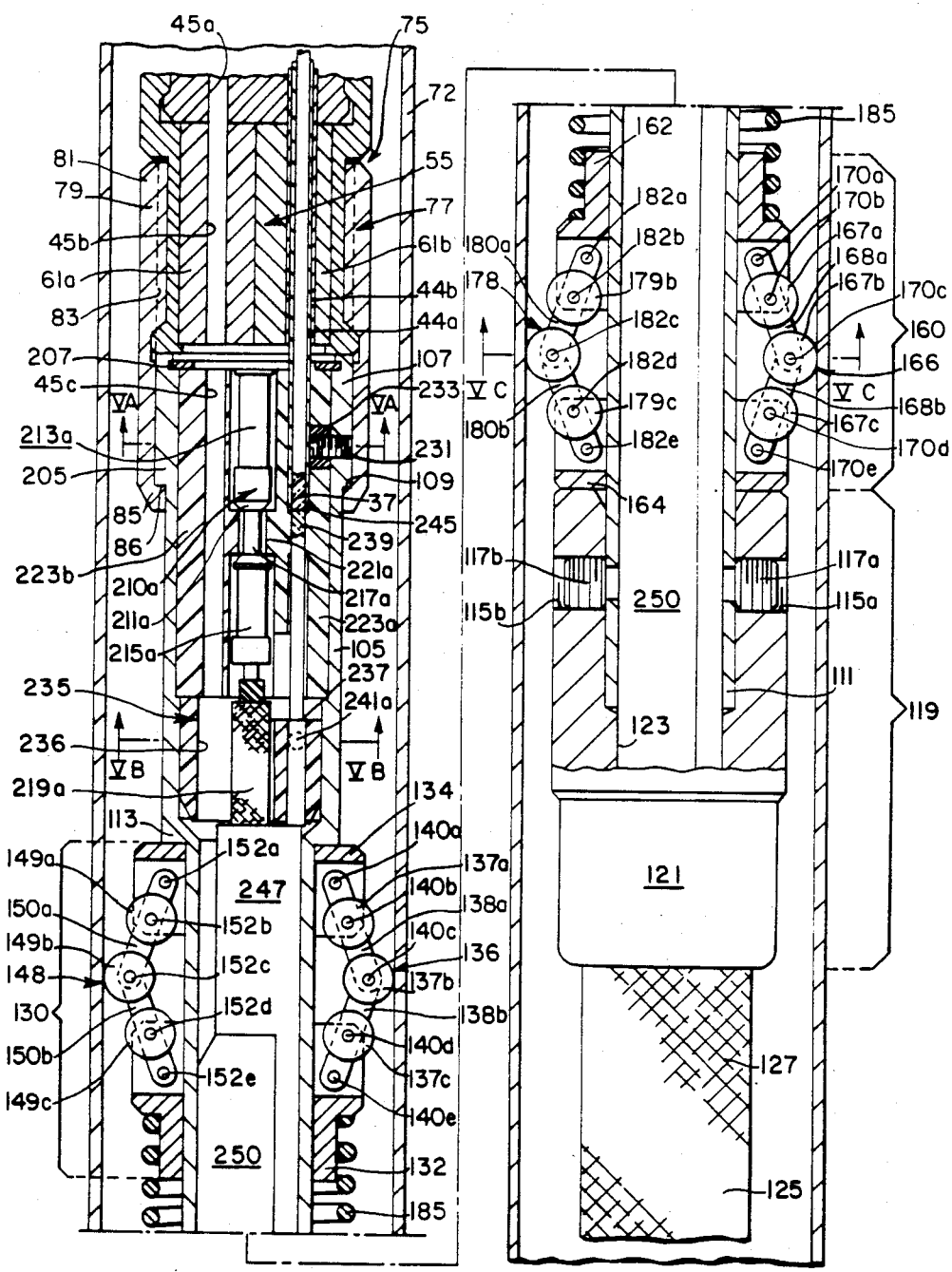
FIG. 4 is a cross-sectional side view of the support mandrel of the heater assembly of the invention.

General Structure and Operation of the Preferred Embodiment

With reference now to FIGS. 1A, 1B and 2, wherein like numerals refer to like components, the heater assembly 1 of the invention generally comprises a heater mandrel 3 formed from a heat-insulating refractory material, such as boron nitride, having a central portion 15 onto which a coil 20 of electrical resistance wire is wound. As will be described in more detail hereinafter, the mandrel 3 further includes an enlarged trailing shoulder 30 having a gas from pressurized gas tank 46 bore 45a for conducting a flow of helium gas out of the ends of a chordially oriented bore 47. As is best seen with reference to FIG. 3A, each of the ends of the bore 47 terminate in flutes 49a and 49b, respectively. These flutes 49a and 49b coact with the inner walls of the sleeve being brazed to direct the flow of helium gas out of the ends of the chordially oriented bore 47 toward the central portion 15 of the heater mandrel 3. The resulting flow of inert gas serves three purposes. First, this gas flow purges the partially-enclosed annular space defined between the edges of the leading and trailing shoulders 5 and 30 and the outer surface of the central portion 15 of the mandrel 3 of ambient atmospheric oxygen, in order to prevent (or at least retard) oxidation of the boron nitride which forms the body of the heater mandrel 3. Second, when the coil 20 is energized, this gas flow will increase the rate of heat transfer between the coil 20 and the inner walls of the sleeve being brazed. Finally, when the coil 20 is de-energized, this gas flow is increased in order to cool down the heater assembly 1, thereby helping to prevent an overheated condition which could damage the various parts within the assembly 1. In the preferred embodiment, the gas flow rate is approximately 5 to 10 cubic feet per hour for purging, and 100 cubic feet per hour for cooling the heater mandrel 3 between braze cycles.

With specific reference now to FIG. 4, the heater assembly 1 further includes a support mandrel 75 which is detachably secured onto the proximal end of the heater mandrel 3 by means of a clamping means 77 formed from a pair of clamping sleeves 79 and 92. The support mandrel 75 further includes a tubular body 105 having a distal roller assembly 130, and a proximal roller assembly 160, each of which includes three sets of spring-loaded rollers in order to apply a positive centering force onto the heater mandrel when the assembly 1 is inserted into a reinforcing sleeve. Finally, the distal end of the support mandrel 75 includes a pin receptacle 210 for receiving the pins 63a, 63b of the connector assembly 55 located at the proximal end of the heater mandrel 3. It should be noted at the outset that the provision of the connector assembly 55, the pin receptacle 210, and the clamping means 77 greatly facilitates replacement of the heater mandrel 3 when the electrical resistance coil 20 wrapped thereabout causes it to burn out.

Specific Description of the Structure and Operation of the Preferred Embodiment Turning now to a more specific description of the heater assembly 1, the enlarged leading shoulder 5 of the heater mandrel 3 has a cylindrical portion 7 which terminates in a frustro-conical end 9. Leading shoulder 5 further includes both a centrally disposed bore 11 and a laterally disposed bore 13. Bore 11 accommodates braided lead wire 26a of the coil 20, while bore 13 houses wire 24 of this coil. Centrally disposed bore 11 does not terminate at the proximal end of the leading shoulder 5, but extends completely through the generally cylindrical body of the mandrel 3, and well into the trailing shoulder 30, where it connects with an angled bore 32a which houses lead wire 26a. As used herein, the words "proximal" and "distal" are used from the perspective of the operator, who manipulates the heater assembly by means of a nylon push-rod 69 connected to the lead wire end of the mandrel 3. The generally cylindrical central portion 15 of the mandrel 3 is disposed between the previously described leading and trailing shoulders 15 and 30. As is indicated in FIG. 1, the centrally disposed portion 15 of the mandrel 3 accommodates the windings of the heater coil 20. The provision of the enlarged shoulders 5 and 30 on either side of the smaller-diameter central portion 15 of the mandrel 3 serves three important functions. First, since these shoulders 5 and 30 are formed from a heat-insulating substance, the inner edges of these shoulders define fairly sharp limits in the longitudinal shape of the heating zone generated by the coil 20. This feature renders the heater assembly 1 particularly useful in carrying out the two-step brazing process described and claimed in patent application Ser. No. 634,336, filed July 25, 1984, since proper implementation of this process requires that the brazing heat be accurately applied along specific longitudinal sections of the sleeve. Secondly, these shoulders 5 and 30 help concentrically space the windings of the coil 20 from the inside walls of the sleeve or other conduit being brazed so that the coil applies uniform heat at all points along its diameter. Thirdly, these shoulders 5 and 30 prevent the windings of the coil 20 from inadvertently rubbing against the inner walls of the sleeve when the heater assembly is slid up and down the tube, which could bunch up the coil windings into a non-uniform configuration.

Figure 6:
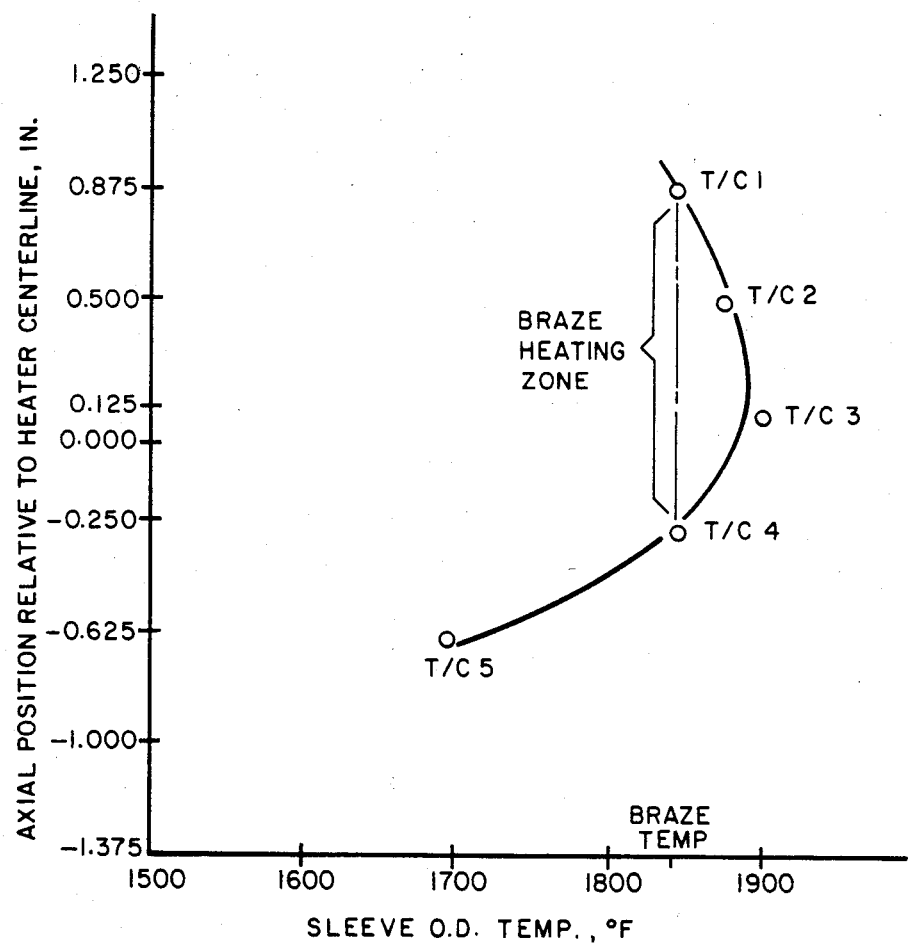
FIG. 6 is a graph illustrating the shape of the thermal gradient along the longitudinal axis of the heater mandrel.

As may best be seen in FIG. 1B, the generally cylindrical central portion of the heater mandrel 3 includes a plurality of helically disposed grooves 17 disposed around its exterior surface. Each of these grooves 17 receives one of the windings of the heater coil 20. The function of these grooves 17 is to reinforce the function of the enlarged shoulders 5 and 30 in preventing the windings of the coil 20 from becoming bunched up or otherwise longitudinally displaced as a result of any incidental friction that the windings experience as the heater assembly 1 is slid through a sleeve/tube combination. Such bunching up of the coil windings could create short circuits in the coil 20, which in turn could form undesirable "hot spots" in the central portion 15 of the mandrel 3. Such "hot spots" could ultimately weaken the material forming the mandrel 3, and create non-uniformities in the pattern of heat flux generated by the coil 20. As a further precaution against formation of such "hot spots", the coil 20 is preferably subdivided into a series of serially-spaced coil sections 22a through 22j, each of which is separated from its neighbors by a small, heat-dissipating gap. This spacing also extends the length of the nearly isothermal heating zone located approximately near the center of the heater mandrel 3 (shown in FIG. 6). Each coil section is preferably about 0.55 in. in diameter, which leaves a radial clearance of about 0.115 in. between the coil 20 and the sleeve 72. At its distal end, the coil continues in the form of the aforementioned wire 24 which in turn becomes the previously mentioned braided lead wire 26a. At its proximal end, the last coil section 22j becomes the braided lead wire 26b. The use of braided lead wires 26a and 26b (each of which is formed from two wires twisted about 12 or 13 turns per inch) is preferable over single-filament type lead wires due to their superior strength and thermal characteristics. The brading effectively reduces the resistance heating of the lead by increasing the conductive cross-section of the wire within the central bore 11 of the heater mandrel 3. This in turn presents the lead from melting at high power levels. As will be described in more detail hereinafter, the braided lead wires 26a and 26b each ultimately extend out of the proximal end of the trailing shoulder 30, where they are connected to the pins of a connector assembly 55. The coil 20 is formed from platinum-rhodium wire approximately 0.02 in. in diameter which includes from 70% to 90% platinum and from 10% to 30% rhodium, and preferably operated at a power level of about 1,000 watts. While an alloy formed anywhere within these ranges will work, the applicants have found that an alloy formed of 70% platinum and 30% rhodium seems to work best. The coil 20 itself is preferably about 0.55 in. in diameter, which leaves about 0.115 in. of radial clearance between the coil 20 and the inside wall of a typical reinforcing sleeve. The advantages associated with the use of braided lead wires, spaced coil sections, and platinum-rhodium alloy wire in the heating coil 20 are specifically set forth in U.S. patent application Ser. Nos. 571,214 and 571,215, filed by John M. Driggers and John M. Driggers et al, respectively, on Jan. 16, 1984 and assigned to Westinghouse Electric Corporation. Both specifications are hereby expressly incorporated herein by reference.

The third major section of the mandrel 3 of the heater assembly 1 is the previously mentioned enlarged, generally cylindrical trailing shoulder 30. Shoulder 30 includes a pair of bores 32a and 32b for receiving the aforementioned braided lead wires 26a and 26b, respectively. As previously indicated, lead wire bore 32a communicates with the proximal end of the centrally disposed bore 11. Braided lead wire bore 32a is traversely disposed to the centrally disposed bore 11 at a small angle, as shown, in order to provide a sufficient amount of electrically insulating mandrel material between the two braided lead wire bores 32a and 32b so that short-circuiting does not inadvertently occur between the lead wires 26a and 26b housed therein. Such a traverse disposition also allows symmetrical, centralized placement of the pin connectors 63a and 63b.

As may best be seen with respect to FIG. 2, trailing shoulder 30 further includes a bore 34 for housing an optical fiber 37. In the preferred embodiment, the optical fiber 37 is a 0.6 mm single-strand quartz fiber having a tip 39 which is ground at a 45° angle in order to prismatically reflect the light along another optical fiber 239 which optically couples the fiber 37 to a two-color pyrometer 42. In the preferred embodiment, a Model No. R-25FO5-0-0-0-00-0-000 pyrometer, manufactured by Ircon, Inc., of Skokie, Ill., is used. Such a two-color pyrometer is preferred because it is not light intensity-dependent. Therefore, any light intensity variations which occur due to clouding of the optical fiber 37 will not create temperature variations in the readings generated by the pyrometer. Further, such pyrometers 42 provide a nearly instantaneous read-out of the temperature of the section of the sleeve 72 which was heated. This is important, since this temperature tends to drop off quickly. An optical system of the above type is capable of sensing temperatures in the range of between 1,300° F. to 2,500° F., while the heating coil 20 is capable of generating temperatures in reinforcing sleeves of about 2,400° F. In order that the prismatic tip 39 of the quartz fiber 37 may be selectively exposed to heat radiated from the inside walls of the sleeve being brazed by the heater coil 20, trailing shoulder 30 of the heater assembly 1 further includes a radially disposed, tapered opening 43. This opening 43 is best seen with respect to FIG. 2, and FIG. 3A. As is evident from these figures, the tapered opening 43 communicates with the distal end of the fiber housing bore 34a in order to provide a window-like thermal waveguide from the outside surface of the trailing shoulder 30 to the prismatic tip 39 of the fiber 37. There are at least three advantages associated with the provision of a housing bore 34a and a tapered waveguide opening 43 in the trailing shoulder 30 of the mandrel 3. First, because the mandrel 3 is formed from a heat-insulating refractory material (such as boron nitride), the positioning of the fiber 37 beneath the surface of the mandrel 3 and away from the heating coil 20 allows the material forming the trailing shoulder 30 to effectively insulate the fiber 37 from the heat emanating directly from the coil 20. As previously mentioned, this is significant since the surface temperature of the coil sections 22a through 22j forming the heater coil 20 can become as high as 3,000° F., while the quartz fiber 37 can read and withstand temperatures to a maximum of only about 2,400° F. Secondly, such insulation, in combination with the directional selectivity afforded by the thermal waveguide opening 43, also insures that the prismatic tip 39 will only be exposed to heat radiated from the inside walls of the sleeve, rather than directly from the windings of the heater coil 20. Hence, placement of the fiber 37 within the trailing shoulder 30 not only preserves it from excessive heat, but also prevents it from optically transmitting erroneously high temperature readings from the windings of the coil 20. Thirdly, the longitudinal spacing between the heater coil 20 and the tapered waveguide opening 43 on the trailing shoulder 30 allows the prismatic tip 39 of the quartz fiber 37 to receive radiant heat from only a longitudinal section of the sleeve which has been heated by the heating coil 20, but which is not in the process of being directly exposed to it. This again enhances the accuracy of the invention, as the spacing of the opening 43 on the trailing shoulder 30 of the mandrel 3 will allow it to "see" only radiant heat generated by a heated longitudinal section of a sleeve subsequent to heating, and not radiant heat which is merely being reflected from the inside walls of the sleeve from the windings of the heater coil 20.

While the invention would be operable for a variety of longitudinal distances between the proximal end of the windings of the coil 20 and the center of the tapered opening 43, this longitudinal spacing is preferably selected so that, if the heater assembly 1 is used to effect the aforementioned two-step brazing process, the prismatic tip 39 of the quartz fiber 37 will be aligned with approximately the center of the first longitudinal section of the sleeve heated (relative to the longitudinal axis of the sleeve) when the heater assembly 1 has been repositioned so as to apply a brazing heat to a second longitudinal section of the sleeve/tube combination which includes the aforementioned ring of brazing material. Such longitudinal spacing between the proximal end of the windings of heater 20 and the center of the tapered opening 43 allows the operator to scan the first heated longitudinal section of the sleeve/tube combination while simultaneously fusing the ring of brazing alloy, thereby obviating the necessity of a separate "scanning" step wherein the fiber reads the temperature of the first heated longitudinal section while the heating coil 20 proceeds to heat the sleeve/tube combination along a section which does not consummate the desired braze joint.

As is shown in FIGS. 2, 3B and 3C, the quartz fiber 37 is preferably disposed within a tubular sheath 44a which is formed from a non-corrosive, heat-resistant material such as stainless steel. As is indicated in FIG. 3C, this tubular sheath 44a extends from just below the tapered opening 43 in the trailing shoulder 30 all the way through a bore 34b in one of the semi-cylindrical insulating pieces 61b of the connector assembly 55. From there, this sheath 44a extends about one-half inch away from the proximal end of the connector assembly 55, where it slidably engages a bore 34c in the support mandrel 75. This sheath 44a helps align and protect the delicate quartz fiber 37 during both the assembly and disassembly of the heater assembly. As is best seen in FIGS. 2, 3B, 3C and 4, sheath 44a is slidably disposed within a tubular alignment member 44b which extends between annular shoulder 53 in the trailing shoulder 30 of the heater mandrel 3, and the proximal end of bore 34b in semi-cylindrical insulating piece 61b. Tubular alignment member 44b helps to properly align the fiber housing bores 34a and 34b of the heater mandrel 3 and the semi-cylindrical piece 61b, respectively, during assembly of the heater assembly 1. Member 44b further prevents the fiber sheath 44a from scraping the walls of the bores 34a and 34b when the fiber 37 is inserted into the heater mandrel 3, which could cause light-blocking particles of boron nitride to collect on the prismatic tip 39 of the fiber 37.

With reference now to FIGS. 2, 3A and 3B, the trailing shoulder of the mandrel 3 also includes a longitudinally disposed gas bore 45 for conducting an air-purging flow of inert gas (preferably helium) from pressurized gas tank 46 around the body of the heater mandrel 3 surrounded by the heating coil 20 during the heating process. As previously pointed out, such a flow of inert gas advantageously prevents the heat-insulating refractory material which forms the central portion 15 of the heater mandrel 3 from reacting the ambient atmospheric oxygen during the brazing process, which in turn lengthens its useful lifespan. Moreover, the applicants have found that such a gas flow unexpectedly enhances the transfer of heat from the heater coil 20 to the inner walls of the sleeve being brazed when the gas is admitted through the gas bore 45 at flow rates of between about 5 to 10 cubic feet per hour. This enhanced heat transfer can cut the heating time down as much as 30%, and permits the heater assembly 1 to operate at a surface temperature approximately 100° F. lower. The lowering of the operational surface temperature of the heater assembly 1 and the shortening of the heating time reinforces the function of the purging gas in discouraging the mandrel 3 from oxidizing. While the inventors are not entirely sure why such a purging flow of helium enhances the transfer of heat from the heating assembly 1 to the inner walls of the sleeve/tube combination, they suspect that this gas flow increases the amount of convestive heat flow which occurs in the annular space between the heater coil 20 and the inner walls of the sleeve being brazed. Interestingly, the flow of helium through the gas bore 45 may also be used to cool down the heater assembly 1 after a brazing operation by increasing the flow rate to about 100 cubic feet per minute. The use of such a gas flow to cool down the mandrel 3 again helps to lengthen the life of the entire heater assembly 1 by minimizing the amount of time that the heater mandrel 3 and the support 75 are exposed to high temperature.

With specific reference now to FIGS. 2 and 3A, this longitudinally disposed gas bore 45 terminates at its distal end into the midpoint of a chordally oriented bore 47. Each of the ends of the bore 47 in turn terminates in short flutes 49a and 49b which longitudinally extend up the outer surface of the trailing shoulder 30 to the junction between the top of the shoulder 30 and the bottom of the heating coil 20. These flutes 49a and 49b coact with the inner surfaces of the reinforcing sleeve to advantageously divert the flow of inert gas from a lateral direction out of the ends of the chordally oriented bore 47 to a generally longitudinal direction, in order that the inert gas might effectively purge the ambient atmospheric gas surrounding the coil-holding central portion 15 of the mandrel 3. The trailing shoulder 30 of the mandrel 3 terminates in a threaded end portion 51 which is circumscribed by an annular shoulder 53 at its distal end for a purpose which will become evident presently. While the leading shoulder 5, the central portion 15, and the trailing shoulder 30 of the mandrel 3 are all integrally formed from a generally cylindrical piece of 99.9% pure boron nitride of a diffusion bonded grade, other refractory materials (such as zirconia and alumina) may also be used. However, the use of boron nitride is preferred due to the fact it is generally easier to machine and is believed to have better thermal shock-resistant characteristics. Additionally, the coefficient of thermal expansion of boron nitride is compatible with the coefficient of thermal expansion of a heating coil formed from a platinum-rhodium alloy.

With reference again to FIG. 1, the threaded end portion 51 of the trailing shoulder 30 of the mandrel 3 is threadedly engaged to a connector assembly 55. The overall function of the connector assembly 55 is to form a solid mechanical and electrical connection between the braided lead wires 26a and 26b and electrical connector pins 63a and 63b. In the preferred embodiment, these terminal pins 63a and 63b are plugged into the pin receptacle 210 of the previously mentioned support mandrel 75. Connector assembly 55 generally includes an externally threaded housing member 56 having an internally threaded, cylindrical skirt 57 extending therefrom. The distal end of housing member 56 and the proximal end of the cylindrical skirt 57 are mutually connected through annular shoulder 58. Like skirt 57, housing member 56 is essentially hollow, and includes a cylindrically shaped space 59 for housing a pair of semi-cylindrical insulating pieces 61a and 61b preferably formed from boron nitride. Additionally, the proximal end of the housing member 56 terminates in an annular capturing flange 60 which secures the semi-cylindrical pieces 61a, 61b within the member 56. Housing member 56, cylindrical skirt 57 and annular shoulder 58 are all integrally formed from No. 300 stainless steel due to its corrosion resistance and favorable machining characteristics.

As may best be seen with reference to FIGS. 1A and 3C, each of the aforementioned semi-cylindrical insulating pieces 61a and 61b includes a pair of parallel, semi-circular grooves 62a, 62.5a and 62b, 62.5b on its flat face for receiving the crimp contacts 64a and 64b of the terminal pins 63a and 63b, respectively. These grooves 62a, 62b and 62.5a, 62.5b are mutually registrable when the flat faces of the two semi-cylindrical insulating pieces 61a and 61b are abutted against one another to form a single, cylindrically shaped insulator member which may be captured between the proximal end of the mandrel 3 and the capturing flange 60 of the housing member 56. When the two semi-cylindrical insulating pieces 61a and 61b are so positioned, the two pairs of semi-cylindrical bores 62a, 62b and 62.5a, 62.5b form the equivalent of two parallel bores which extend along the longitudinal axis of the mandrel 3. As is best seen in FIG. 1, each of these bores is recessed at its proximal and distal end in order to complement the shape of the pins 63a and 63b, each of which includes an upper stop shoulder 66a, 66b and a lower stop shoulder 65a, 65b. These upper and lower stop shoulders 66a, 66b and 65a, 65b, respectively, serve to lock each of the pins 63a, 63b in the single, cylindrical insulator member formed when the flat sides of the two semi-cylindrical insulating pieces 61a and 61b are abutted together and captured within the cylindrical space inside the housing member 56. An electrical and mechanical connection is formed between each of the pins 63a and 63b and its corresponding braided lead wire 26a, 26b by inserting the lead wire within its respective crimp contact 64a, 64b, and squeezing the center of the crimp contacts with an appropriate crimping tool. In the preferred embodiment, each of the pins 63a, 63b (and their associated crimp contacts 64a, 64b) is formed from gold-plated copper. After the crimp connection between the braided lead wires 26a and 26b and their respective pins 63a, 63b is made, the housing member 56 is preferably screwed onto the threaded end portion 51 of the trailing shoulder 30 in the position shown in FIG. 1 until the distal edge of the cylindrical skirt 57 abuts the annular shoulder 53 in the trailing mandrel shoulder 30, and the annular shoulder 58 firmly engages the proximal end of the shohlder 30. Such threaded engagement between the housing member 56 and the threaded end portion 51 of the trailing shoulder 30 of the mandrel 3 achieves two purposes. First, such positioning firmly secures the cylindrically shaped insulator formed from the two semi-cylindrical insulating pieces 61a, 61b between the capturing flange 60 and the proximal end of the mandrel 3. Secondly, such engagement serves to equilibrate any shear forces which the housing member 56 and cylindrical skirt 57 might apply onto the end of the trailing shoulder 30 of the mandrel 3 when the heater assembly 1 is pushed through various sections of a sleeve/tube combination. This force-equilibrating function is important, as the boron nitride from which the mandrel 3 is preferably formed tends to be brittle.

Turning now to FIG. 4, the distal end of the support mandrel 75 of the heater assembly 1 is detachably secured to the proximal end of the heater mandrel 3 by clamping means 77. Clamping means 77 is generally formed from a clamping sleeve 79 located on the heater mandrel 3 and the support mandrel 75, respectively. The heater mandrel clamping sleeve 79 includes a distal end 81 having a threaded interior 83, and a proximal end 85 having an annular retaining shoulder 86. The annular retaining shoulder 86 is complementary in shape to an annular retaining shoulder 109 located at the distal end 107 of the tubular body 105 of the support mandrel 75. As is evident from FIG. 4, the clamping sleeve 79 secures the distal end of the support mandrel 75 to the proximal end of the heater mandrel 3 when the annular retaining shoulder 109 of the tubular body 105 is received within the proximal end 85 of the clamping sleeve 79 so that the complementary annular retaining shoulders 86 and 109 are engaged as shown, and the threaded interior 83 of the clamping sleeve 79 is screwed over the threaded exterior of the housing member 56 of connector assembly 55. Support mandrel 75 generally includes the previously mentioned tubular body 105 which is preferably formed from Series 300 stainless steel. This tubular body 105 includes a distal end 107 having the previously mentioned annular retaining shoulder 109 at its edge, as well as a proximal end 111 of reduced diameter. The distal and proximal ends 107 and 111 are separated by means of an annular offset 113. Proximal end 111 includes four bores 115a, 115b, 115c and 115d (the last two of which are not shown) equidistantly spaced 90° around its circumference. These bores 115a, 115b, 115c and 115d receive the set screws 117a, 117c and 117d (the last two of which are likewise not shown) of the cylindrical coupling member 121 of a push-rod coupling assembly 119. As is indicated in FIG. 4, the cylindrical coupling member 121 includes a centrally disposed bore 123 for receiving the proximal end 111 of the tubular body 105. It should be noted that the push-rod coupling assembly 119 further includes a section of Telfon ® (polytetrafluoroethylene) coupling tubing 125 for coupling a nylon push-rod (not shown) to the heater assembly 1, and dampening any residual "curl" that the nylon push-rod may have engrained in its plastic memory. Such "curl" can disadvantageously apply a non-centering force onto the heater assembly 1 which in turn can cause the heating coil 20 to transfer heat to the inside of a sleeve along a non-uniform heat flux. In the preferred embodiment, the Teflon ® coupling tubing 125 is covered with a stainless steel braid 127. The tubular body 105 further includes both a distal roller assembly 130 and a proximal roller assembly 160 in the positions indicated in FIG. 4. Distal roller assembly 130 is formed from a distal retaining ring 134 which fixedly abuts the proximal edge of the previously mentioned annular offset 113, and a slidably movable proximal retaining ring 132. Proximal and distal retaining rings 132 and 134 are linked together by means of three spring-loaded rollers 136, 142 (not shown) and 148 equidistantly spaced 120° around their circumferences. Each of the rollers 136, 142 and 148 is formed from three wheels 137a, 137b and 137c; 143a, 143b and 143c (not shown); and 149a, 149b and 149c, each of which is rotatably mounted on a double bar linkage formed from three pairs of linkage members 138a, 138b, 144a, 144b (not shown), and 150a, 150b, respectively. Each of the rollers 136, 142 and 148 further includes five pins 140a, 140b, 140c, 140d and 140e; 146a, 146b, 146c, 146d and 146e (not shown); and 152a, 152b, 152c, 152d and 152e. The two outer pins in each pin set (140a, 140e, 146a, 146e, and 152a, 152e) pivotally mount the outer ends of each of the pairs of linkage members 138a, 138b, 144a, 144b, and 150a, 150b to the proximal and distal retaining rings 132 and 134, respectively, while the center pin in each pin set (140c, 146c and 152c) connects each of these pairs of linkage members to one another. Additionally, the middle three pins of each pin set (140b, 140c, 140d; 146b, 146c, 146d; and 152b, 152c and 152d) rotatably mount the three wheels 137a, 137b, 137c; 143a, 143b, 143c and 149a, 149b and 149c associated with each of the rollers 136, 142 and 148. In the preferred embodiment, each of the wheels associated with each of the rollers 136, 142 and 148 is approximately 0.142 in. in diameter.

Figure 5A:
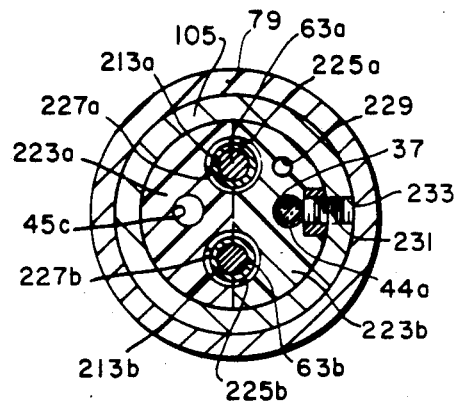
FIG. 5A is a cross-sectional view of the support mandrel taken along line A—A in FIG. 4.
Figure 5B:
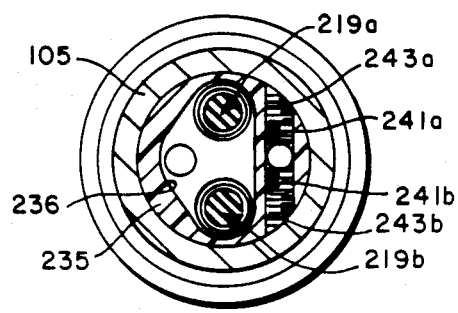
FIG. 5B is a cross-sectional view of the support mandrel taken along line B—B in FIG. 4.
Figure 5C:
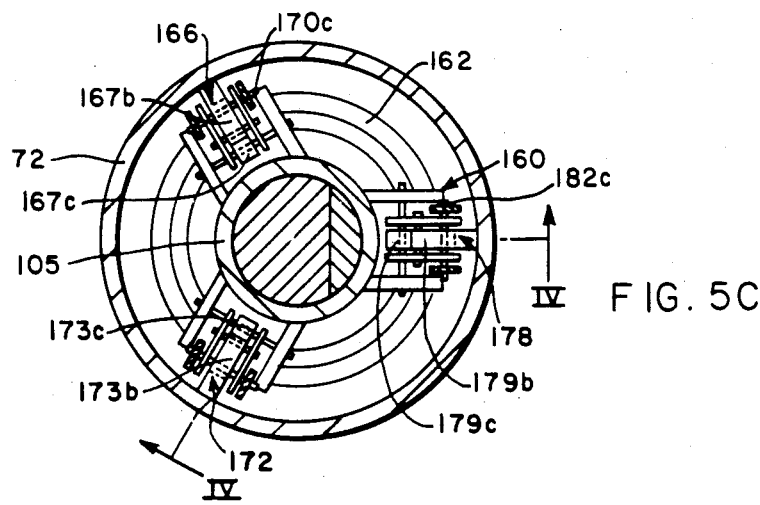
FIG. 5C is a cross-sectional view of the support mandrel taken along line C—C in FIG. 4.

Turning now to proximal roller assembly 160 and FIGS. 4 and 5C, this component likewise includes a slidably movable distal retaining ring 162 and a proximal retaining ring 164 which normally abuts the distal end of cylindrical coupling member 121. Proximal roller assembly 160 includes three rollers 166, 172 and 178 which are also equidistantly spaced 120° apart around the circumference of the retaining rings 162 and 164. Each of these rollers is likewise formed from three wheels 167a, 167b and 167c; 172a, 172b and 172c; and 179a, 179b and 179c. These wheels are likewise mounted onto pairs of linkage members 168a, 168b; 174a, 174b, and 180a, 180b by means of pins 170a, 170b, 170c, 170d and 170e; 176a, 176b, 176c, 176d and 176e; and 182a, 182b, 182c, 182d and 182e, in the same manner described with respect to distal roller assembly 130. In both the distal and proximal roller assemblies 130 and 160, a plurality of guide rods (not shown) are slidably engaged within complementary bores located in proximal retaining ring 132 and distal retaining ring 162 of the distal and proximal roller assemblies 130 and 160 in order to maintain the alignment between the rollers 136, 142 and 148 of the distal roller assembly 130 with the rollers 166, 172 and 178 of the proximal roller assembly 160. In operation, the compression spring 185 biases the slidably movable proximal retaining ring 132 of the distal roller assembly 130 toward the annular offset 113 of the tubular body 105 on one side, and the slidably movable retaining ring 164 of the proximal roller assembly 160 toward the end of the cylindrical coupling member 121 of the push-rod coupling assembly 119. Because the pivotally mounted ends of each of the double-bar linkages in both the distal and proximal roller assemblies 130 and 160 are positioned slightly below the center line of the wheels 137b, 143b, 149b, 167b, 173b and 179b, respectively, each of the rollers 136, 142, 148 and 166, 172 and 178 will tend to "break" into the extended position illustrated in FIG. 4 as a result of the compressive force applied by spring 185 on the slidably movable proximal and distal retaining rings 132 and 162 of the distal and proximal roller assemblies 130 and 160, respectively. It is the tendency of these rollers to assume such a "broken" position which results in the application of the aforementioned centering force onto the heater assembly 1 as a whole when this assembly is inserted into a reinforcing sleeve 72. More specifically, the net force applied onto the heater assembly by the distal and proximal roller assemblies 130 and 160 will be three substantially equal, two-point centering forces spaced 120° apart which will tend to maintain the entire length of both the support mandrel 75 and attached heater mandrel 3 concentrically disposed within the sleeve 72. The distal end of the tubular body 105 of the support mandrel 75 includes a phenolic insert 205 which is held in place by means of a retaining ring 207. Phenolic insert 205 is preferably formed from a high-temperature (NEMA Grade 7) phenolic resin. As may best be seen with reference to FIGS. 4 and 5a, this phenolic insert 205 includes a pair of bores 34c and 45c for housing the quartz fiber 37 and sheath 44a, and for admitting a flow of helium gas, respectively. Phenolic insert 205 further houses a pair of pin receptacles 210a, 210b which recieve the male pins 63a and 63b of the connector assembly 55 of the heater mandrel 3. Each of these pin receptacles 210a, 210b includes a female pin terminal 211a, 211b having a resilient barrel 213a, 213b at its distal end, and a crimp connector 215a, 215b at its proximal end, for receiving the ends of electrical power cables 219a and 219b, respectively. The resilient barrels 213a, 213b and the crimp connectors 215a, 215b are separated by sections of reduced diameter 217a and 217b. These sections of reduced diameter allow the pin receptacles 210a and 210b to be secured within the annular shoulders 221a and 221b existing within the phenolic insert 205. As was the case with the terminal pins 63a and 63b, each of the pin receptacles 210a and 210b are preferably integrally constructed from gold-plated copper.

In order to facilitate the disassembly of the support mandrel 75, the phenolic insert 205 is formed from two semi-cylindrical halves 223a and 223b. Each of these halves includes a pair of parallel, semi-circular grooves 225a, 225b, and 227a, 227b, which form a pair of parallel bores which extend completely through the phenolic insert 205 when the two semi-cylindrical halves are abutted against one another in the position shown in FIG. 5A. The resulting bores include a center section of reduced diameter in order to create the previously mentioned annular shoulders 221a and 221b. As is best seen in FIG. 5A, the top semi-cylindrical half 223a also includes a pulling hole 22a which is internally threaded with a 0-30 thread in order to allow this component to be easily engaged and withdrawn from the tubular body 105 of the support mandrel 75 by an appropriately threaded rod when it is desired to disassemble the support mandrel 75. Finally, the top semi-cylindrical half 223a includes a set screw 231 threadedly engaged within a bore 233 for securing the quartz fiber 37 and sheath 44c within the bore 34c of the insert 205.

With reference again to FIGS. 4 and 5B, an optical fiber keeper piece 235 is positioned directly behind the proximal end of phenolic insert 205. This keeper piece 235 is preferably formed from the same Grade 7 phenolic resin as insert 205. One side of keeper piece 235 abuts the proximal end of phenolic insert 205, while the other side is recessed a small distance away from this end of the insert 205. As may best be seen in FIG. 5B, the abutting side of piece 235 includes a triangular opening 236 which admits the power cables 219a, 219b leading to the previously discussed female pin terminals 211a, 211b, as well as a flow of helium gas. The recessed side of this piece 235 includes a bore 237 through which an unsheathed and uninsulated quartz optical fiber 239 extends, as well as a pair of opposing set screws 241a, 241b threadedly engaged in chordally-oriented bores 243a, 243b, for securing this fiber 239 within the bore 237. The distal end of quartz fiber 239 optionally couples to the proximal end of the sheath quartz fiber 37 by abutting it at optical junction 245. The provision of set screws 241a, 241b in keeper piece 235 is important, because they allow the polished distal end of quartz fiber 239 to be precisely positioned against the polished proximal end of quartz fiber 37. While one continuous optical fiber could be used in lieu of the two separate fiber sections 37 and 239, the use of two such fiber sections is preferred because it allows the working, distal end of the quartz fiber to be easily and conveniently replaced in the event that the prismatic tip 39 of the fiber becomes damaged or optically occluded due to boron nitride dust, or deposits created by long exposure to the brazing heat. In closing, it should be noted that the provision of a recess in one side of keeper piece 235 helps to insulate the proximal end of the support mandrel 75 from the heat generated by heater mandrel 3.

The balance of the interior of the tubular body 105 of the support mandrel 75 contains insulation in the form of heat-shrinkable plastic 247 and woven Teflon ® 250 which surrounds, shields and insulates both the electrical power cables 219a, 219b and the quartz fiber 239.

In operation, the entire heater assembly 1 is inserted through the open end of the tube to be brazed and slid up to one of the expanded ends of the reinforcing sleeve 72 so that the center of the heating coil 20 is aligned with the ring of brazing alloy (not shown) surrounding the end of the tube 72. The electric heating coil 20 is then actuated so that the heater assembly 1 begins to apply a brazing heat to the tube end. At the same time, a purging flow of helium gas is admitted through the gas bores 45c, 45b and 45a and the chordially oriented bore 47 of the mandrel 3, and finally out through the gas directing flutes 49a and 49b. Throughout the duration of the brazing operation, the flutes 49a and 49b direct this purging gas flow in the annular space between the heating coil 20 and the inner walls of the sleeve 72, so that the central portion 15 of the mandrel 3 is exposed to little or no ambient atmospheric oxygen while the heating coil 20 is actuated. This, of course, prevents the mandrel 3 from oxidizing. As was previously mentioned, helium gas administered from pressurized gas tank 46 at a flow rate of approximately 5 to 10 cubic feet per hour (CFH) is preferably used at this juncture in the method due to the fact that helium is not only inert, but also capable of enhancing the heat transfer between the heater assembly 1 and the tube 72. After the brazing operation is completed, the heating coil 20 is deactuated, and the 5 CFH flow of helium is increased to approximately 100 CFH (or greater) in order to cool the heater assembly 1.

All of the foregoing method steps are then repeated on the other end of the sleeve 72 so that the sleeve is secured within its respective tube. After both ends of the sleeve 72 have been brazed in the previously described manner, the heater assembly 1 is slid out of the tube.

We claim as our invention:

1. A heater assembly for applying heat across a selected longitudinal section of the interior of a conduit, comprising a heater mandrel which is slidably insertable within said conduit, and which includes means for directing a flow of inert gas in the space between said heater mandrel and the inside of said conduit in order to purge this space of ambient atmospheric oxygen.

2. The heater assembly of claim 1, wherein said heater mandrel includes a heating element mounted on its outside surface, and at least one bore for directing said flow of gas in the space between the conduit and the outside surface of the mandrel in order to prevent said outside surface from oxidizing.

3. The heater assembly of claim 1, further including a support mandrel having a centering means for centering said heater mandrel within said conduit.

4. The heater assembly of claim 2, wherein said heating element is a coil formed from electrical resistance wire which is divided into a plurality of spaced-apart coil sections for generating a uniform pattern of heat flux along the longitudinal axis of the central portion of the heater mandrel.

5. A heater assembly for applying heat across a selected longitudinal section of the interior of a conduit, comprising a heater mandrel which is slidably insertable within a conduit, and a support mandrel having a centering means for centering the heater mandrel along the longitudinal axis of the conduit, wherein said heater mandrel includes means for directing a flow of inert gas in the space between the inside of the conduit and the heater mandrel in order to purge this space of ambient atmospheric oxygen.

6. The heater assembly of claim 5, wherein said heater mandrel includes a heating element mounted on its outside surface, and at least one bore for directing said flow of gas in the space between the conduit and the outside surface of the mandrel in order to prevent said outside surface from oxidizing.

7. The heater assembly of claim 6, wherein said heating element is a coil formed from electrical resistance wire which is divided into a plurality of spaced-apart coil sections for generating a uniform pattern of heat flux along the longitudinal axis of the central portion of the heater mandrel.

8. A heater assembly for applying heat across a selected longitudinal section of the interior of a conduit, comprising an elongated heater mandrel which is slidably insertable within said conduit, and which includes a means for directing the flow of inert gas in the space between the heater mandrel and the inside of said conduit in order to purge this space from ambient atmospheric oxygen and thereby prevent the heater mandrel from oxidizing.

9. The heater assembly of claim 8, wherein said heater mandrel includes a cylindrical center portion flanked by enlarged leading and trailing shoulders and an electrical resistance element wound over the surface of said central portion, and wherein said means for directing a flow of gas includes at least one bore within the trailing shoulder of the heater mandrel.

10. The heater assembly of claim 9, wherein the outer diameter of the electrical resistance element is at least about 75 percent of the inner diameter of the section of conduit being heated.

11. The heater assembly of claim 9, wherein said bore terminates in at least one flute located in the outer surface of said trailing shoulder of the heater mandrel which directs the flow of inert gas flowing through the bore around the central portion of the mandrel.

12. The heater assembly of claim 8, wherein said flow of inert gas also increases the transfer of heat from the heater assembly to the conduit.

13. A heater assembly for applying heat across a selected longitudinal section of the interior of a conduit, comprising an elongated heater mandrel having an electrical resistance element mounted around its outside surface and a generally cylindrical support mandrel having a centering means formed from a plurality of roller assemblies for uniformly spacing the electrical resistance element within the interior of the conduit.

14. The heater assembly of claim 13, wherein each of the roller assemblies is spring-biased, and wherein said roller assemblies each include rollers which are uniformly spaced around the circumference of the support mandrel.

15. The heater assembly of claim 13, wherein said heater mandrel further includes a connector assembly which is detachably connectable to an electrical receptacle in the support mandrel.

16. A heater assembly for applying a brazing heat across a selected longitudinal section of the interior of a tube, comprising:
    (a) an elongated heater mandrel having a generally cylindrical central portion onto which an electrical resistance element is wound, and enlarged leading and trailing shoulders flanking either end of the central portion, respectively, for spacing the electrical resistance element out of contact with the tube walls when said heater mandrel is slid into the interior of the tube, and a means for directing a flow of inert gas in the annular space defined between the inside surface of the tube and the outside surface of the central portion of the heater mandrel in order to purge this space from ambient atmospheric oxygen and thereby prevent the heater mandrel from oxidizing, and
    (b) an elongated, cylindrical support mandrel detachably connected to the heater mandrel which includes a centering means for applying a positive centering force on the heater mandrel in order to concentrically space the electrical resistance element from the inside surface of the tube.

17. The heater assembly of claim 16, wherein said means for directing a flow of gas includes at least one bore within the trailing shoulder of the heater mandrel which is fluidly connected to a source of pressurized inert gas.

18. The heater assembly of claim 17, wherein said bore terminates in at least one flute located in the outer surface of said trailing shoulder of the heater mandrel which directs the flow of inert gas flowing through the bore around the central portion of the mandrel.

19. The heater assembly of claim 16, wherein said centering means is formed from a plurality of roller assemblies.

20. The heater assembly of claim 19, wherein each of the roller assemblies is spring-biased, and wherein said roller assemblies include rollers which are uniformly spaced around the circumference of the support mandrel.

21. The heater assembly of claim 16, wherein said heater mandrel further includes a connector assembly which is detachably connectable to an electrical receptacle in the support mandrel.

22. The heater assembly of claim 16, further including a clamping means for detachably securing the heater mandrel from the support mandrel.

23. A heater assembly for applying a brazing heat across a selected longitudinal section of the interior of a tube, comprising:
    (a) an elongated heater mandrel having a generally cylindrical central portion onto which an electrical resistance element is wound, and enlarged leading and trailing shoulders flanking either end of the central portion, respectively, for spacing the electrical resistance element out of contact with the interior surface of the tube when said heater mandrel is slid into the interior of the tube, a means for directing a flow of inert gas in the annular space defined between the inside surface of the central portion of the heater mandrel in order to purge this space from ambient atmospheric oxygen and thereby prevent the heater mandrel from oxidizing, and an electrical connector assembly including at least one pin which is electrically connected to the electrical resistance element; and
    (b) an elongated, cylindrical support mandrel including a centering means formed from a plurality of resilient roller assemblies for applying a positive centering force on the heater mandrel when the heater assembly is slid into a tube, and an electrical receptacle for receiving the pin of the connector assembly and electrically converting the electrical resistance element to a source of power; and
    (c) a clamping means for detachably securing the heater mandrel to the support mandrel.

24. The heater assembly of claim 23, wherein said electrical resistance element is wound around the central portion of the heater mandrel in a series of coil sections periodically separated by gaps along the longitudinal axis of the heater mandrel in order to generate a more uniform pattern of heat flux.

25. The heater assembly of claim 23, wherein the outer diameter of each of the coil sections is between about 75 percent to 90 percent of the inner diameter of the section of the tube being heated.

26. A heater assembly for applying heat across a selected longitudinal section of the interior of a conduit, comprising a heater mandrel which is slidably insertable within said conduit, and which includes means for directing a flow of inert gas in the space between said heater mandrel and the inside of said conduit in order to purge this space of ambient atmospheric oxygen, and a support mandrel, and a clamping means for detachably securing said heater mandrel to said support mandrel.

27. A heater assembly for applying heat across a selected longitudinal section of the interior of a conduit, comprising a heater mandrel which is slidably insertable within a conduit, a support mandrel having a centering means for centering the heater mandrel along the longitudinal axis of the conduit, and a clamping means for detachably securing said heater mandrel to said support mandrel.

28. A heater assembly for applying heat across a selected longitudinal section of the interior of a conduit, comprising an elongated heater mandrel that is slidably insertable within said conduit, and which includes a means for directing a flow of inert gas in the space between the heater mandrel and the inside of said conduit in order to purge this space from ambient atmospheric oxygen and thereby prevent the heater mandrel from oxidizing, and a support mandrel having a means for concentrically spacing said heater mandrel within said conduit which includes at least two resilient roller assemblies.

29. The heater assembly of claim 28, wherein said heater mandrel includes an electrical resistance element having at least two lead wires, and a connector assembly for detachably connecting said leads to a receptacle in said support mandrel.

30. The heater assembly of claim 28 further including a clamping means for detachably securing said heater mandrel to said support mandrel.

31. A heater assembly for applying heat across a selected longitudinal section of the interior of a conduit, comprising a source of pressurized inert gas, and a heater mandrel which is slidably insertable within said conduit, and which includes means for directing a flow of inert gas in the space between said heater mandrel and the inside of the conduit in order to purge this space of ambient atmospheric oxygen, wherein said gas flow directing means is fluidly connected to said source of pressurized inert gas.

32. A heater assembly for applying heat across a selected longitudinal section of the interior of a conduit, comprising a longitudinal heater mandrel which is slidably insertable within said conduit, and which includes a bore that is transversely disposed with respect to the longitudinal axis of the mandrel for directing a flow of inert gas in the space between said heater mandrel and the inside of the conduit in order to purge this space of ambient atmospheric oxygen.

33. The heater assembly of claim 1, wherein said transversely disposed bore terminates in at least one flute for directing the flow of inert gas around the central portion of said mandrel.

* * * * *